US 11,875,949 B2

(12) United States Patent
Fukunaga

(10) Patent No.: US 11,875,949 B2
(45) Date of Patent: Jan. 16, 2024

(54) METHOD OF MANUFACTURING ELECTRONIC COMPONENT

(71) Applicant: Murata Manufacturing Co., Ltd., Nagaokakyo (JP)

(72) Inventor: Daiki Fukunaga, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 35 days.

(21) Appl. No.: 17/844,980

(22) Filed: Jun. 21, 2022

(65) Prior Publication Data

US 2022/0328252 A1    Oct. 13, 2022

Related U.S. Application Data

(63) Continuation of application No. 16/864,180, filed on May 1, 2020, now Pat. No. 11,393,632.

(30) Foreign Application Priority Data

May 16, 2019    (JP) .................................. 2019-092795

(51) Int. Cl.
   *H01G 4/30*    (2006.01)
   *H01G 4/12*    (2006.01)
   (Continued)

(52) U.S. Cl.
   CPC ............... *H01G 4/30* (2013.01); *H01G 4/012* (2013.01); *H01G 4/12* (2013.01); *H01G 4/232* (2013.01)

(58) Field of Classification Search
   CPC ............ H01G 4/30; H01G 4/012; H01G 4/12; H01G 4/232; H01G 4/306; H01G 4/33; H01G 4/224; H01G 13/003; H01G 13/006
   See application file for complete search history.

(56) References Cited

U.S. PATENT DOCUMENTS

| 8,995,109 B1* | 3/2015 | Tsutsumi | ................ B32B 37/24 361/301.4 |
| 9,039,859 B2* | 5/2015 | Tanaka | .................... H01G 4/30 156/89.12 |

(Continued)

FOREIGN PATENT DOCUMENTS

| CN | 106920693 A | * | 7/2017 | ............. H01G 4/005 |
| JP | 2007173626 A | * | 7/2007 | ............. H01G 4/228 |

(Continued)

OTHER PUBLICATIONS

Office Action in JP2019-092795, dated Feb. 14, 2023, 4 pages.
(Continued)

*Primary Examiner* — Jeffrey T Carley
(74) *Attorney, Agent, or Firm* — Keating & Bennett, LLP

(57) ABSTRACT

A method of manufacturing an electronic component includes preparing an unfired multilayer body including first and second main surfaces facing each other in a stacking direction, first and second side surfaces facing each other in a width direction, and first and second end surfaces facing each other in a length direction, bonding one main surface of the unfired multilayer body to an elongated first adhesive sheet, conveying the first adhesive sheet in a first direction in which the first adhesive sheet approaches an elongated second adhesive sheet, and bonding one side surface of the unfired multilayer body to the second adhesive sheet, conveying the second adhesive sheet in a second direction different from the first direction to peel off the unfired multilayer body from the first adhesive sheet, polishing another side surface of the unfired multilayer body, and forming a first insulating layer on the polished another side surface.

16 Claims, 11 Drawing Sheets

(51) Int. Cl.
*H01G 4/012* (2006.01)
*H01G 4/232* (2006.01)

(56) References Cited

U.S. PATENT DOCUMENTS

| | | | |
|---|---|---|---|
| 9,839,135 B2* | 12/2017 | Ogawa | H05K 3/0052 |
| 2003/0005576 A1* | 1/2003 | Tsukada | H05K 3/403 |
| | | | 29/610.1 |
| 2006/0035071 A1* | 2/2006 | Ishiyama | C04B 35/62665 |
| | | | 156/89.12 |
| 2017/0213649 A1 | 7/2017 | Kato et al. | |
| 2017/0271083 A1* | 9/2017 | Makino | H01G 4/30 |
| 2017/0330686 A1* | 11/2017 | Sugita | H01G 4/0085 |
| 2018/0269000 A1* | 9/2018 | Tanaka | H01G 4/1236 |

FOREIGN PATENT DOCUMENTS

| | | | |
|---|---|---|---|
| JP | 2016207878 A * | 12/2016 | |
| JP | 2016207878 A | 12/2016 | |
| JP | 2017135177 A | 8/2017 | |
| JP | 2017135202 A | 8/2017 | |
| JP | 2017147358 A | 8/2017 | |
| WO | WO-2016093153 A1 * | 6/2016 | H01F 17/0013 |

OTHER PUBLICATIONS

Office Action in JP2019-092795, dated Sep. 6, 2022, 3 pages.
Fukunaga, "Method of Manufacturing Electronic Component", U.S. Appl. No. 16/864,180, filed May 1, 2020.

\* cited by examiner

US 11,875,949 B2

METHOD OF MANUFACTURING ELECTRONIC COMPONENT

CROSS REFERENCE TO RELATED APPLICATIONS

This application claims the benefit of priority to Japanese Patent Application No. 2019-092795 filed on May 16, 2019. The entire contents of this application are hereby incorporated herein by reference.

BACKGROUND OF THE INVENTION

1. Field of the Invention

The present invention relates to a method of manufacturing an electronic component.

2. Description of the Related Art

Conventionally known is an electronic component including a plurality of dielectric layers and a plurality of internal electrodes that are alternately stacked on one another, such as a multilayer ceramic capacitor.

As one example of a method of manufacturing such an electronic component, Japanese Patent Laid-Open No. 09-153433 discloses a method of manufacturing an electronic component in the following manner. Specifically, an unfired multilayer body is first fabricated, which is to be formed as a multilayer body after firing that includes a plurality of dielectric layers and a plurality of internal electrodes alternately stacked on one another so as to have both side surfaces from which the internal electrodes are exposed. Then, an insulating layer is formed so as to cover the internal electrodes exposed on both side surfaces of the unfired multilayer body, which is then subjected to firing. Then, an external electrode is formed on each of both end surfaces of the unfired multilayer body. Thereby, the above-mentioned electronic component is manufactured. An unfired multilayer body can be fabricated by cutting a stack of ceramic green sheets each having an internal electrode pattern printed thereon.

In this case, each side surface of the unfired multilayer body obtained by cutting the stack of ceramic green sheets extends in parallel with the vertical direction. Thus, it is difficult to form an insulating layer on each side surface in this state. In particular, for manufacturing a large number of electronic components, a method of efficiently forming an insulating layer on each side surface of a multilayer body is desirable. Japanese Patent Laying-Open No. 09-153433 however fails to disclose a specific method of efficiently forming an insulating layer on each side surface of a multilayer body.

SUMMARY OF THE INVENTION

Preferred embodiments of the present invention provide methods of manufacturing an electronic component, by each of which an insulating layer is able to be efficiently formed on each side surface of a multilayer body.

A method of manufacturing an electronic component according to a preferred embodiment of the present invention is to manufacture an electronic component including at least a multilayer body and an insulating layer that covers a side surface of the multilayer body. The multilayer body includes a plurality of dielectric layers and a plurality of internal electrodes that are alternately stacked on one another. The method includes preparing an unfired multilayer body that is to be formed as the multilayer body after firing, the unfired multilayer body including a first main surface and a second main surface that face each other in a stacking direction; a first side surface and a second side surface that face each other in a width direction orthogonal or substantially orthogonal to the stacking direction; and a first end surface and a second end surface that face each other in a length direction orthogonal or substantially orthogonal to the stacking direction and the width direction; bonding one main surface of the first main surface and the second main surface of the unfired multilayer body to a first adhesive sheet having an elongated shape; conveying the first adhesive sheet having the one main surface of the unfired multilayer body bonded thereto in a first direction in which the first adhesive sheet approaches a second adhesive sheet having an elongated shape, and bonding one side surface of the first side surface and the second side surface of the unfired multilayer body to the second adhesive sheet; conveying the second adhesive sheet in a second direction different from the first direction to peel off the unfired multilayer body bonded to the first adhesive sheet and the second adhesive sheet from the first adhesive sheet; polishing another side surface of the first side surface and the second side surface of the unfired multilayer body having the one side surface bonded to the second adhesive sheet; and forming a first insulating layer on the polished another side surface.

In the above-described method of manufacturing an electronic component, the internal electrodes include a first internal electrode and a second internal electrode. The first internal electrode and the second internal electrode before firing are exposed at each of the first side surface and the second side surface of the unfired multilayer body. In the forming a first insulating layer, a first insulating sheet is affixed to the polished another side surface. The method may further include peeling off the unfired multilayer body from the second adhesive sheet to expose the one side surface; polishing the exposed one side surface of the unfired multilayer body; and affixing a second insulating sheet in order to form a second insulating layer on the polished one side surface.

In the above-described method of manufacturing an electronic component, the first insulating sheet is affixed to a plurality of the another side surfaces of a plurality of the unfired multilayer bodies, and the second insulating sheet is affixed to a plurality of the one side surfaces of the unfired multilayer bodies. The method may further include in a state where the first insulating sheet as one sheet is affixed to the another side surfaces of the unfired multilayer bodies, and the second insulating sheet as one sheet is affixed to the one side surfaces of the unfired multilayer bodies, applying pressing force from outside the first insulating sheet and the second insulating sheet to each of the unfired multilayer bodies, and cutting the first insulating sheet and the second insulating sheet to separate the unfired multilayer bodies from each other.

The first insulating sheet may have a surface on which an adhesive layer is formed. The adhesive layer is higher in adhesive strength than the first adhesive sheet and the second adhesive sheet.

In the bonding one side surface of the first side surface and the second side surface of the unfired multilayer body to the second adhesive sheet, the unfired multilayer bodies provided in a row may be simultaneously or substantially simultaneously bonded to the second adhesive sheet. In the cutting the first insulating sheet and the second insulating sheet to separate the unfired multilayer bodies from each other, the pressing force may be applied to each of the unfired multilayer bodies included in a prescribed number of rows among the unfired multilayer bodies provided in rows.

The first direction and the second direction may form an obtuse angle.

The first adhesive sheet may be lower in adhesive strength than the second adhesive sheet.

According to methods of manufacturing an electronic component according to preferred embodiments of the present invention, in the state where one main surface of the unfired multilayer body is bonded to the first adhesive sheet having an elongated shape, the first adhesive sheet is conveyed in the first direction in which the first adhesive sheet approaches the second adhesive sheet having an elongated shape, to thereby bond one side surface of the unfired multilayer body to the second adhesive sheet. Then, by conveying the second adhesive sheet in the second direction different from the first direction, the unfired multilayer body bonded to the first adhesive sheet and the second adhesive sheet is peeled off from the first adhesive sheet. Then, the exposed other side surface is polished, and thereafter, the first insulating layer is formed. In other words, one main surface of the unfired multilayer body is first bonded to the first adhesive sheet, and thereafter, one side surface of the unfired multilayer body is efficiently bonded to the second adhesive sheet, to thereby allow easy formation of an insulating layer on the another side surface. Thus, an insulating layer is able to be efficiently formed on each side surface of the unfired multilayer body.

Furthermore, since an insulating layer is formed after polishing the side surface, the occurrence of minutely small gaps between the side surface and the insulating layer is able to be significantly reduced or prevented, so that peeling off of the insulating layer is able to be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter described to explain the features of the present invention. In the following, a multilayer ceramic capacitor will be described as an example of an electronic component to be manufactured. It should be noted that the electronic component includes at least a multilayer body including a plurality of dielectric layers and a plurality of internal electrodes that are alternately stacked on one another and an insulating layer that covers the side surface of the multilayer body, but is not limited to such a multilayer ceramic capacitor.

Multilayer Ceramic Capacitor

Figure 1:
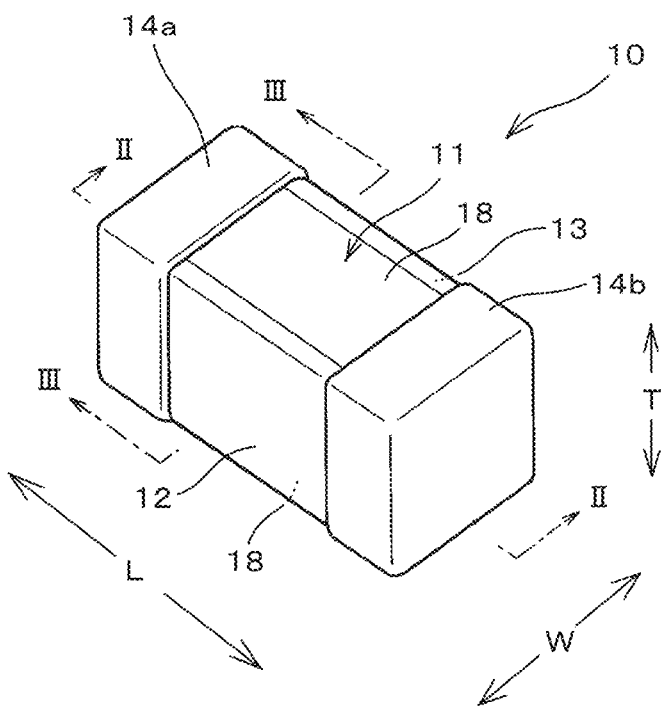
FIG. 1 is a perspective view showing a multilayer ceramic capacitor as an example of an electronic component.
Figure 2:
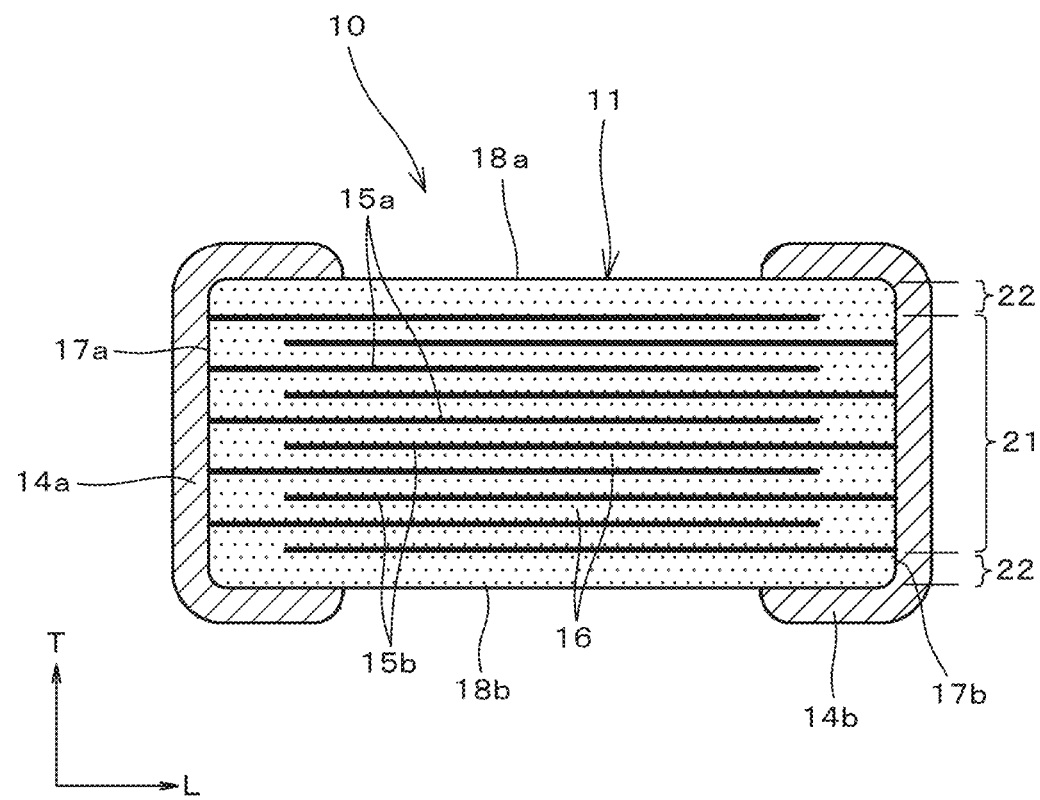
FIG. 2 is a view of the multilayer ceramic capacitor shown in FIG. 1 in a cross section taken along a line II-II.
Figure 3:
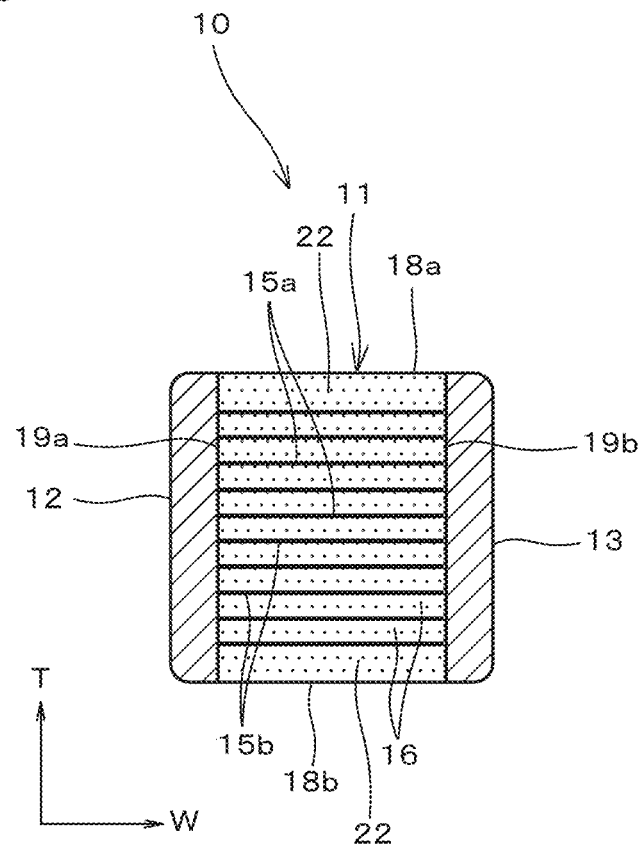
FIG. 3 is a view of the multilayer ceramic capacitor shown in FIG. 1 in a cross section taken along a line III-III.
Figure 4:
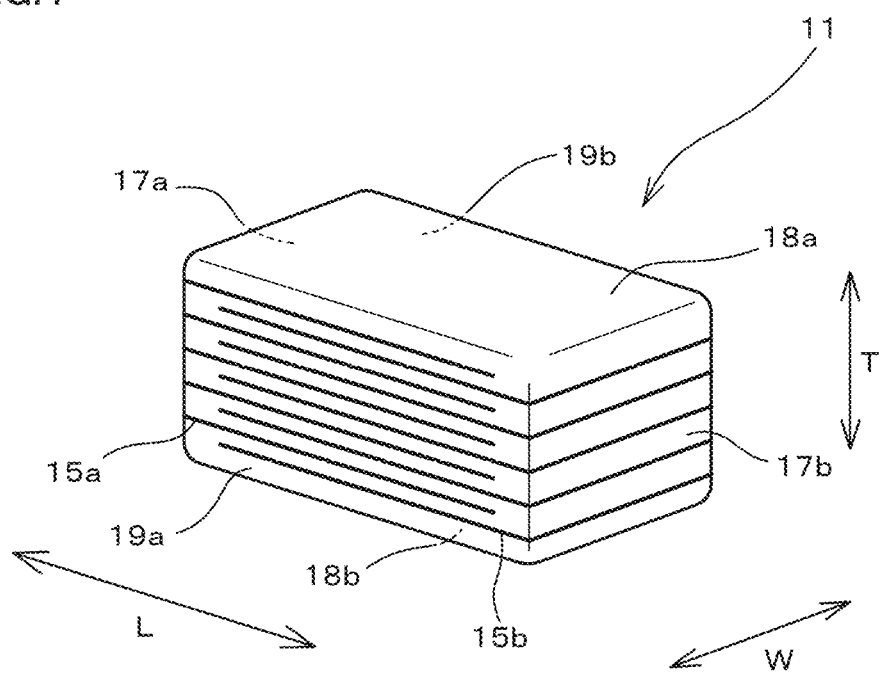
FIG. 4 is a perspective view of a multilayer body of the multilayer ceramic capacitor.

FIG. 1 is a perspective view showing a multilayer ceramic capacitor 10 as an example of an electronic component. FIG. 2 is a view of multilayer ceramic capacitor 10 shown in FIG. 1 in a cross section taken along a line II-II. FIG. 3 is a view of multilayer ceramic capacitor 10 shown in FIG. 1 in a cross section taken along a line III-III. FIG. 4 is a perspective view of a multilayer body 11 forming multilayer ceramic capacitor 10.

As shown in FIGS. 1 to 3, multilayer ceramic capacitor 10 has a rectangular parallelepiped or substantially rectangular parallelepiped shape, and includes a multilayer body 11, a first insulating layer 12, a second insulating layer 13, a first external electrode 14a, and a second external electrode 14b. First external electrode 14a and second external electrode 14b face each other as shown in FIG. 1.

The direction in which first external electrode 14a and second external electrode 14b face each other is defined as a length direction L of multilayer ceramic capacitor 10. The direction in which a first internal electrode 15a and a second internal electrode 15b (each of which is described herein) are stacked on each other is defined as a stacking direction T. The direction orthogonal or substantially orthogonal to each of length direction L and stacking direction T is defined as a width direction W. As shown in FIG. 1, length direction L is orthogonal or substantially orthogonal to stacking direction T and width direction W.

Multilayer ceramic capacitor 10 includes a corner portion and a ridgeline portion, each of which is rounded. The corner portion is a portion at which three planes of multilayer ceramic capacitor 10 cross each other. The ridgeline portion is a portion at which two planes of multilayer ceramic capacitor 10 cross each other.

As shown in FIG. 4, multilayer body 11 includes a first end surface 17a and a second end surface 17b that face each other in length direction L, a first main surface 18a and a second main surface 18b that face each other in stacking direction T, and a first side surface 19a and a second side surface 19b that face each other in width direction W.

First end surface 17a and second end surface 17b extend in width direction W and stacking direction T. First main surface 18a and second main surface 18b extend in length direction L and width direction W. First side surface 19a and second side surface 19b extend in length direction L and stacking direction T.

As shown in FIGS. 2 and 3, multilayer body 11 includes an inner layer portion 21 and an outer layer portion 22.

Inner layer portion 21 includes internal electrodes 15a, 15b and a dielectric layer 16. The internal electrodes include a first internal electrode 15a and a second internal electrode 15b. Dielectric layer 16 is sandwiched between first internal electrode 15a and second internal electrode 15b. A plurality of first internal electrodes 15a and a plurality of second internal electrodes 15b are alternately stacked on one another with dielectric layer 16 interposed between the plurality of first internal electrodes 15a and the plurality of second internal electrodes 15b, to thus form inner layer portion 21.

First internal electrode 15a and second internal electrode 15b face each other in stacking direction T with dielectric layer 16 interposed between the plurality of first internal electrodes 15a and the plurality of second internal electrodes 15b. Capacitance occurs by the portion where first internal electrode 15a and second internal electrode 15b face each other with dielectric layer 16 interposed between the plurality of first internal electrodes 15a and the plurality of second internal electrodes 15b.

Dielectric layer 16 preferably includes a plurality of crystalline particles each including Ba and Ti, and each having a perovskite-type structure, for example.

Dielectric layer 16 extends in width direction W and length direction L. First internal electrode 15a has a flat plate shape along dielectric layer 16 and extends to first end surface 17a of multilayer body 11. Second internal electrode 15b has a flat plate shape along dielectric layer 16 and extends to second end surface 17b of multilayer body 11.

Furthermore, first internal electrode 15a and second internal electrode 15b are exposed at each of first side surface 19a and second side surface 19b of multilayer body 11.

First internal electrode 15a and second internal electrode 15b each preferably includes Ni, for example. In addition to Ni, first internal electrode 15a and second internal electrode 15b each may include metal, for example, Cu, Ag, Pd, an Ag-Pd alloy, and Au. Furthermore, first internal electrode 15a and second internal electrode 15b each may include the same or similar dielectric particles as those of dielectric layer 16.

Outer layer portion 22 is provided on both sides of inner layer portion 21 in stacking direction T, and more specifically, provided on both sides of the internal electrodes in stacking direction T that are located on both outermost sides in stacking direction T among the plurality of first internal electrodes 15a and the plurality of second internal electrodes 15b. In other words, inner layer portion 21 is sandwiched between two outer layer portions 22 provided on both outsides in stacking direction T. Outer layer portion 22 is a region in which first internal electrode 15a and second internal electrode 15b do not appear in a view, seen in length direction L, of an optional cross section of multilayer body 11 that extends in stacking direction T and width direction W. Outer layer portion 22 is preferably made of the same or similar material as that of dielectric layer 16, for example.

First insulating layer 12 is in contact with first side surface 19a of multilayer body 11 to cover first side surface 19a. Second insulating layer 13 is in contact with second side surface 19b of multilayer body 11 and covers second side surface 19b. In other words, multilayer body 11 is sandwiched between the first insulating layer 12 and the second insulating layer 13 from both sides in width direction W.

As described below, first insulating layer 12 and second insulating layer 13 each have a two-layer structure. However, first insulating layer 12 and second insulating layer 13 each may include three or more layers or may include one layer. Furthermore, the material of each of first insulating layer 12 and second insulating layer 13 may be the same or substantially the same as or different from that of dielectric layer 16.

As shown in FIG. 1, first external electrode 14a is provided over the entire or substantially the entire first end surface 17a of multilayer body 11 and over the entire or substantially the entire ends of first insulating layer 12 and second insulating layer 13 on the first end surface 17a side, and extends therefrom partially over both sides in stacking direction T and both sides in width direction W. First external electrode 14a is electrically connected to first internal electrode 15a.

As shown in FIG. 1, second external electrode 14b is provided over the entire or substantially the entire second end surface 17b of multilayer body 11 and over the entire or substantially the entire ends of first insulating layer 12 and second insulating layer 13 on the second end surface 17b side, and extends therefrom partially over both sides in stacking direction T and both sides in width direction W. Second external electrode 14b is electrically connected to second internal electrode 15b.

First external electrode 14a and second external electrode 14b each include an underlying electrode layer and a plated layer that is provided on the underlying electrode layer, for example.

The underlying electrode layer includes at least one of layers, for example, a baked electrode layer, a resin electrode layer, and a thin electrode layer, as will be described below.

The baked electrode layer may include glass and metal, and may include one layer or two or more layers. The baked electrode layer preferably includes metal, for example, Cu, Ni, Ag, Pd, and Au, or an alloy of Ag and Pd.

The baked electrode layer is formed by baking a multilayer body to which an electrically conductive paste including glass and metal has been applied. Baking may be performed simultaneously or substantially simultaneously with firing of the unfired multilayer body or may be performed after firing of the unfired multilayer body.

The resin electrode layer may be a layer including electrically conductive particles and a thermosetting resin, for example. When the resin electrode layer is provided, the resin electrode layer may be provided directly on the multilayer body without providing a baked electrode layer. The number of resin electrode layers may be one or may be more than one.

The thin electrode layer is preferably formed by deposition of metal particles and having a thickness of about 1 μm or less, for example. The thin electrode layer may be formed by known thin-film forming methods, for example, a sputtering method or an evaporation method.

The plated layer provided on the underlying electrode layer preferably includes metal, for example, Cu, Ni, Ag, Pd, and Au, or an alloy of Ag and Pd. The number of plated layers may be one or may be more than one. The plated layer preferably has, for example, a two-layer structure including an Ni-plated layer and an Sn-plated layer. The Ni-plated layer significantly reduces or prevents the underlying electrode layer from being eroded by the solder that mounts multilayer ceramic capacitor 10. The Sn-plated layer significantly increases the wettability of the solder that mounts multilayer ceramic capacitor 10.

Also, first external electrode 14a and second external electrode 14b do not have to include the above-described underlying electrode layer, but may include a plated layer that is directly provided on multilayer body 11. The plated layer is directly connected to first internal electrode 15a or second internal electrode 15b.

Method of Manufacturing Multilayer Ceramic Capacitor

Figure 5:
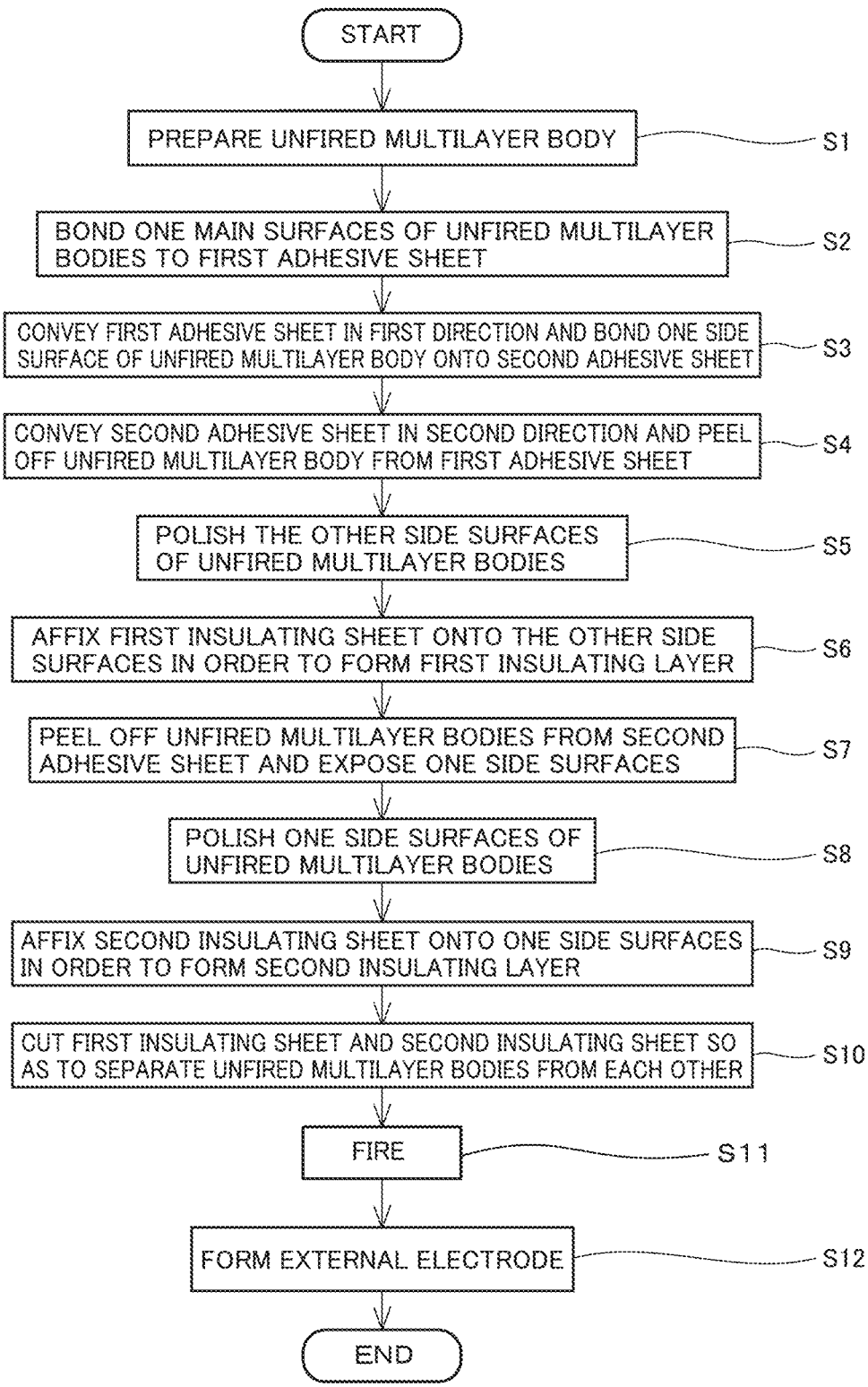
FIG. 5 is a flowchart showing an example of the steps of manufacturing a multilayer ceramic capacitor according to a preferred embodiment of the present invention.

The following is an explanation about an example of a method of manufacturing multilayer ceramic capacitor 10 according to a preferred embodiment of the present invention having the above-described structure. FIG. 5 is a flowchart showing an example of the steps of manufacturing multilayer ceramic capacitor 10.

In step S1 in FIG. 5, an unfired multilayer body that is to be formed as multilayer body 11 after firing is prepared. The unfired multilayer body may be prepared in advance or may be produced by conventionally known methods. For example, a plurality of ceramic green sheets each including an electrically conductive paste for internal electrodes applied thereto are stacked on one another and cut into pieces each having a prescribed size. Thus, an unfired multilayer body is able to be produced.

Figure 6:
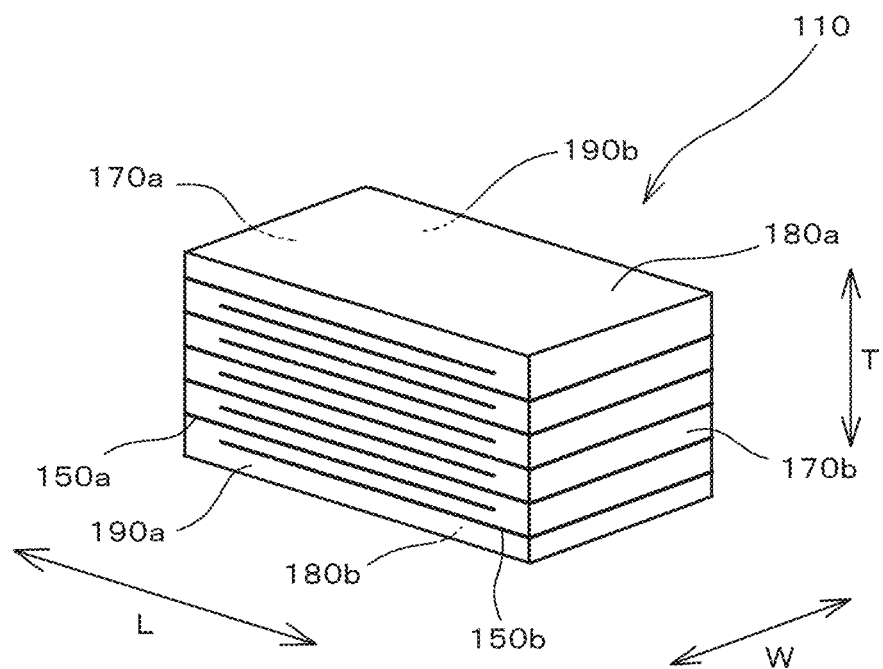
FIG. 6 is a perspective view of an unfired multilayer body.

FIG. 6 is a perspective view of an unfired multilayer body 110. Unfired multilayer body 110 includes a first main surface 180a and a second main surface 180b that face each other in stacking direction T, a first side surface 190a and a second side surface 190b that face each other in width direction W orthogonal or substantially orthogonal to stacking direction T, and a first end surface 170a and a second end surface 170b that face each other in length direction L orthogonal or substantially orthogonal to stacking direction T and width direction W.

At first end surface 170a of unfired multilayer body 110, the first internal electrode before firing (that is, a first unfired internal electrode 150a) is exposed. At second end surface 170b of unfired multilayer body 110, the second internal electrode before firing (that is, a second unfired internal electrode 150b) is exposed. Also, first unfired internal electrode 150a and second unfired internal electrode 150b are exposed at each of first side surface 190a and second side surface 190b of unfired multilayer body 110.

In step S2 after step S1, one main surface of first main surface 180a and second main surface 180b of each unfired multilayer body 110 is bonded to the first adhesive sheet having an elongated shape. In the following description, one main surface of first main surface 180a and second main surface 180b is defined as first main surface 180a while the other main surface of first main surface 180a and second main surface 180b is defined as second main surface 180b, but one main surface may be defined as second main surface 180b while the other main surface may be defined as first main surface 180a.

Figure 7:
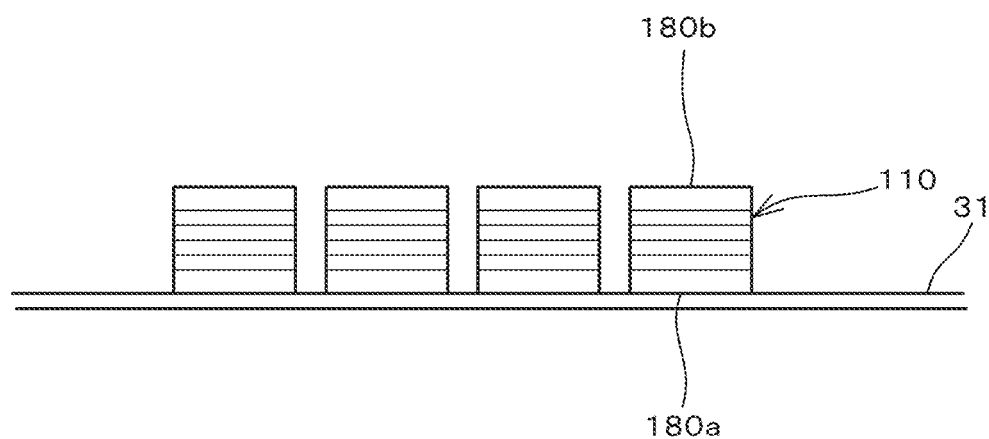
FIG. 7 is a plan view showing the state where the first main surfaces of the unfired multilayer bodies are bonded to the first adhesive sheet having an elongated shape.

FIG. 7 is a diagram showing the state where first main surfaces 180a of unfired multilayer bodies 110 are bonded to a first adhesive sheet 31 having an elongated shape. A plurality of unfired multilayer bodies 110 are bonded to first adhesive sheet 31, and the plurality of unfired multilayer bodies 110 are provided in a row in the short-side direction orthogonal or substantially orthogonal to the long-side direction of first adhesive sheet 31 and provided in a plurality of rows in the long-side direction.

In step S3 after step S2, first adhesive sheet 31 including first main surface 180a of each unfired multilayer body 110 bonded thereto is conveyed in the first direction in which first adhesive sheet 31 approaches the second adhesive sheet having an elongated shape, to bond one side surface of first side surface 190a and second side surface 190b of each unfired multilayer body 110 to a second adhesive sheet 32. In the following description, one side surface of first side surface 190a and second side surface 190b is defined as second side surface 190b while the other side surface of first side surface 190a and second side surface 190b is defined as first side surface 190a, but one side surface may be defined as first side surface 190a while the other side surface may be defined as second side surface 190b.

Figure 8:
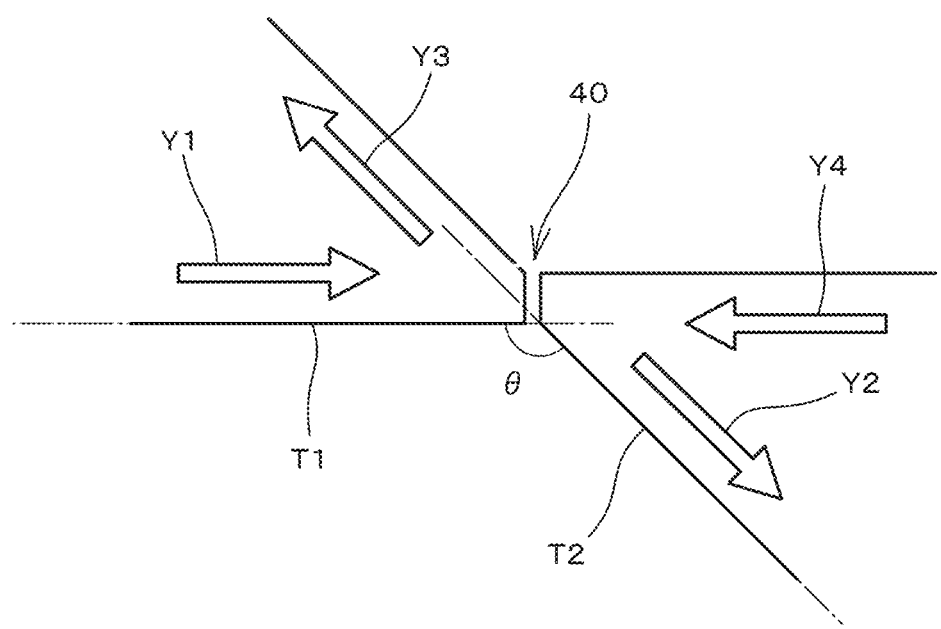
FIG. 8 is a diagram showing the first conveyance path along which the first adhesive sheet is conveyed, and the second conveyance path along which the second adhesive sheet is conveyed.

FIG. 8 is a diagram showing a first conveyance path T1 along which first adhesive sheet 31 is conveyed, and a second conveyance path T2 along which second adhesive sheet 32 is conveyed. First adhesive sheet 31 is conveyed along first conveyance path T1 in a first direction Y1 toward a re-affixing position 40, and thereafter, conveyed in a third direction Y3 and moved away from re-affixing position 40.

Second adhesive sheet 32 is conveyed along second conveyance path T2 in a fourth direction Y4 toward re-affixing position 40, and thereafter, conveyed in a second direction Y2 and moved away from re-affixing position 40.

First adhesive sheet 31 is preferably lower in adhesive strength than second adhesive sheet 32, for example. As first adhesive sheet 31 is lower in adhesive strength than second adhesive sheet 32, each unfired multilayer body 110 bonded to first adhesive sheet 31 and second adhesive sheet 32 is readily peeled off from first adhesive sheet 31, as described below.

Figure 9A:
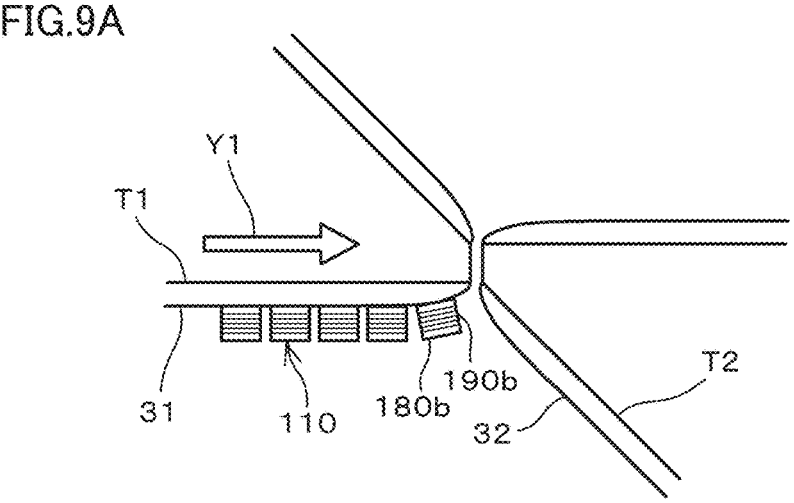
FIG. 9A is a diagram showing a method of re-affixing, to the second adhesive sheet, the unfired multilayer body bonded to the first adhesive sheet, and showing the state where the first adhesive sheet having the unfired multilayer bodies bonded thereto is conveyed in the first direction.
Figure 9B:
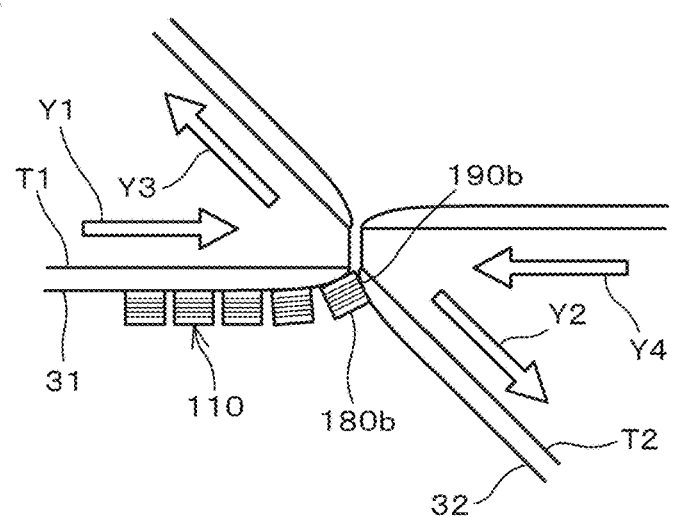
FIG. 9B is a diagram showing a method of re-affixing, to the second adhesive sheet, the unfired multilayer body bonded to the first adhesive sheet, and showing the state where the first side surface of a leading unfired multilayer body is bonded to the second adhesive sheet.
Figure 9C:
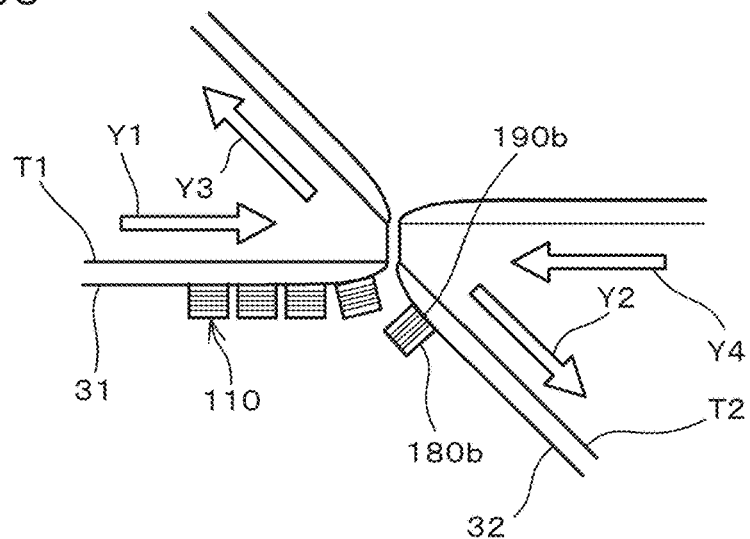
FIG. 9C is a diagram showing a method of re-affixing, to the second adhesive sheet, the unfired multilayer body bonded to the first adhesive sheet, and showing the state where the unfired multilayer body is peeled off from the first adhesive sheet as a result of conveyance of the second adhesive sheet in the second direction.

FIGS. 9A to 9C each are a diagram showing a method of re-affixing, to second adhesive sheet 32, unfired multilayer body 110 bonded to first adhesive sheet 31. FIG. 9A shows the state where first adhesive sheet 31 including first main surfaces 180a of unfired multilayer bodies 110 bonded thereto is conveyed in first direction Y1. At this time, second side surface 190b as one side surface of each unfired multilayer body 110 faces forward in the conveyance direction.

FIG. 9B shows the state where second side surface 190b of each unfired multilayer body 110 in a leading row is bonded to second adhesive sheet 32. As described above, a plurality of unfired multilayer bodies 110 are bonded in rows to first adhesive sheet 31. Accordingly, the plurality of unfired multilayer bodies 110 provided in a line or substantially in a line in a leading row are simultaneously or substantially simultaneously bonded to second adhesive sheet 32. In this state, the plurality of unfired multilayer bodies 110 in the leading row are bonded to each of first adhesive sheet 31 and second adhesive sheet 32.

In step S4 after step S3 in FIG. 5, second adhesive sheet is conveyed in second direction Y2 different from first direction Y1, to thus peel off unfired multilayer bodies 110 bonded to first adhesive sheet 31 and second adhesive sheet 32 from first adhesive sheet 31. Second direction Y2 extends away from re-affixing position 40.

FIG. 9C is a diagram showing the state where unfired multilayer body 110 bonded to first adhesive sheet 31 and second adhesive sheet 32 is peeled off from first adhesive sheet 31 as a result of conveyance of second adhesive sheet 32 in second direction Y2.

Subsequently, unfired multilayer bodies 110 bonded to first adhesive sheet 31 are sequentially conveyed to re-affixing position 40, and re-affixed to second adhesive sheet 32.

An angle θ (see FIG. 8) between first direction Y1 and second direction Y2 is preferably an obtuse angle, for example. When angle θ between first direction Y1 and second direction Y2 is about 90° or less, unfired multilayer body 110 bonded to second adhesive sheet 32 may collide with a subsequent unfired multilayer body 110 that is conveyed while being bonded to first adhesive sheet 31. In contrast, in the case where angle θ formed between first direction Y1 and second direction Y2 is an obtuse angle, unfired multilayer body 110 bonded to second adhesive sheet 32 is moved away from an approaching subsequent unfired multilayer body 110 as shown in FIG. 9C, so that collision between the unfired multilayer body 110 bonded to second adhesive sheet 32 and the subsequent unfired multilayer body 110 is able to be significantly reduced or prevented.

Furthermore, second adhesive sheet 32 is preferably conveyed at a speed higher than that of first adhesive sheet 31, for example. Second adhesive sheet 32 is conveyed at a speed higher than that of first adhesive sheet 31, which is able to significantly reduce or prevent collision between unfired multilayer body 110 bonded to second adhesive sheet 32 and a subsequent unfired multilayer body 110 that is conveyed while being bonded to first adhesive sheet 31. Particularly in the case where the distance between unfired multilayer bodies 110 bonded to first adhesive sheet 31 is relatively narrow, collision is able to be significantly reduced or prevented between unfired multilayer body 110 bonded to second adhesive sheet 32 and a subsequent unfired multilayer body 110 that is conveyed while being bonded to first adhesive sheet 31.

First adhesive sheet 31 and second adhesive sheet 32 may be conveyed continuously or may be conveyed intermittently. In the case where first adhesive sheet 31 and second adhesive sheet 32 are conveyed intermittently, for example, when first adhesive sheet 31 is conveyed to bond unfired multilayer body 110 to second adhesive sheet 32, conveyance of first adhesive sheet 31 is stopped. Then, when second adhesive sheet 32 is conveyed to thereby peel off unfired multilayer body 110 from first adhesive sheet 31, conveyance of first adhesive sheet 31 is resumed.

Step S5 after step S4 in FIG. 5 includes polishing the other side surface of first side surface 190a and second side surface 190b of each unfired multilayer body 110 including one side surface bonded to second adhesive sheet 32. In other words, in the state where one side surface is bonded to second adhesive sheet 32, the other side surface is exposed, and therefore, polished.

The other side surface of unfired multilayer body 110 is able to be polished, for example, by a rotary polishing machine. However, the polishing method is not limited to the method by a rotary polishing machine, but may be any method.

Figure 10:
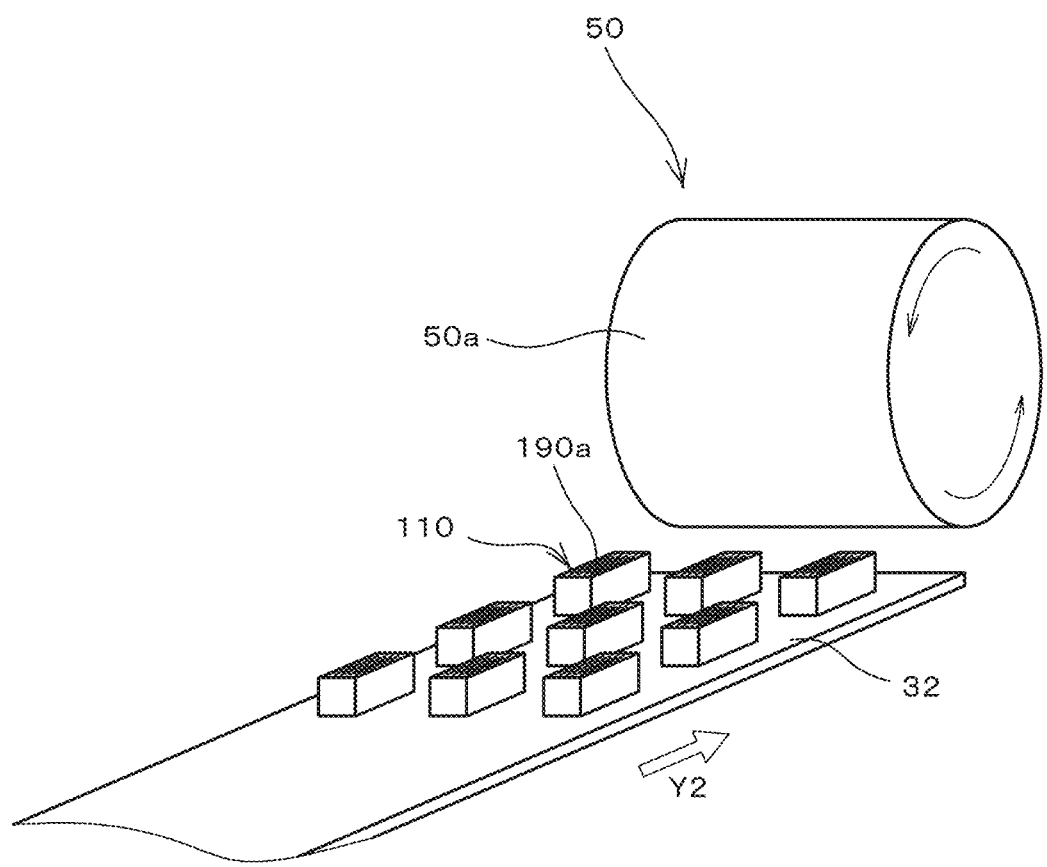
FIG. 10 is a diagram showing the state where a rotary polishing machine polishes the first side surfaces as the other side surfaces of the unfired multilayer bodies.

FIG. 10 is a diagram showing the state where a rotary polishing machine 50 polishes first side surfaces 190a as the other side surfaces of unfired multilayer bodies 110. Rotary polishing machine 50 has a cylindrical or substantially cylindrical shape including an outer circumferential surface 50a that defines and functions as a polishing surface. Thus, to polish first side surface 190a of unfired multilayer body 110, in the state where outer circumferential surface 50a of rotary polishing machine 50 is pressed against first side surface 190a of unfired multilayer body 110, outer circumferential surface 50a is rotated in the circumferential direction, to thereby polish first side surface 190a. Since a plurality of unfired multilayer bodies 110 are bonded in rows to second adhesive sheet 32, first side surfaces 190a of the plurality of unfired multilayer bodies 110 provided in rows are able to be simultaneously or substantially simultaneously polished.

Figure 11:
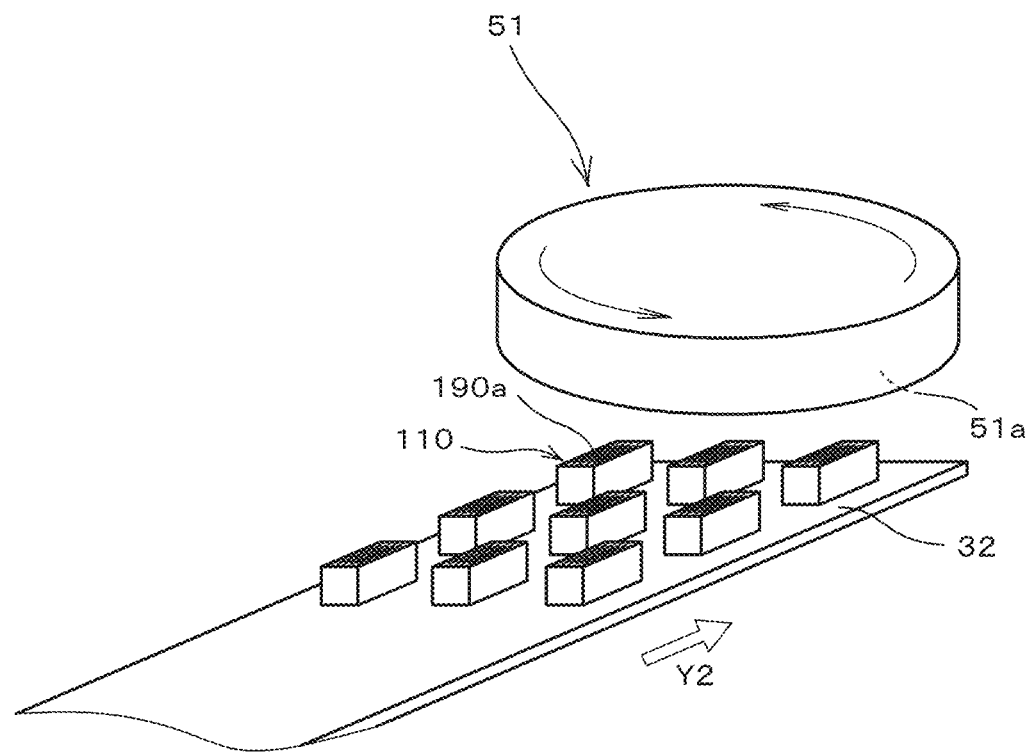
FIG. 11 is a diagram showing the state where another rotary polishing machine polishes the first side surfaces as the other side surfaces of the unfired multilayer bodies.

FIG. 11 is a diagram showing the state where another rotary polishing machine 51 polishes first side surfaces 190a as the other side surfaces of unfired multilayer bodies 110. This rotary polishing machine 51 has a cylindrical or substantially cylindrical shape including a circular or substantially circular surface 51a in a plan view. This circular or substantially circular surface 51a defines and functions as a polishing surface.

By polishing first side surface 190a as the other side surface of each unfired multilayer body 110, any foreign matters existing on first side surface 190a are able to be removed, and an occurrence of a gap between first side surface 190a and the first insulating sheet is able to be significantly reduced or prevented (as described herein). Accordingly, peeling off of first insulating layer 12 in multilayer body 11 after firing is able to be significantly reduced or prevented.

In step S6 after step S5 in FIG. 5, in order to form the first insulating layer, the first insulating sheet having an elongated shape is affixed onto the polished other side surface of each unfired multilayer body 110. The first insulating sheet is sized to be affixed onto the other side surfaces of the plurality of unfired multilayer bodies 110. One first insulating sheet is affixed onto the other side surfaces of the plurality of unfired multilayer bodies 110.

Figure 12:
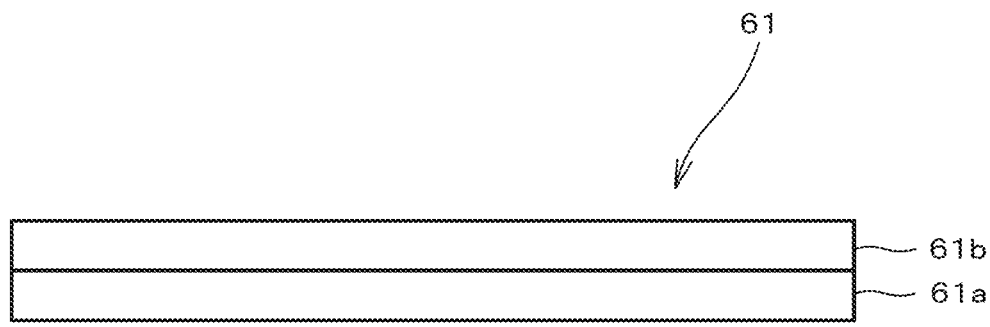
FIG. 12 is a cross-sectional view showing the first insulating sheet.

FIG. 12 is a cross-sectional view showing a first insulating sheet 61. First insulating sheet 61 includes an insulating layer 61a and an adhesive layer 61b. The material of insulating layer 61a may be substantially the same as or different from the material of dielectric layer 16.

Adhesive layer 61b is higher in adhesive strength than first adhesive sheet 31 and second adhesive sheet 32. Adhesive layer 61b is provided on the surface of first insulating sheet 61 and is to be bonded to the other side surface of each unfired multilayer body 110.

It should be noted that first insulating sheet 61 may include three or more layers or may include one insulating layer including an adhesive material.

In step S7 after step S6 in FIG. 5, unfired multilayer bodies 110 are peeled off from second adhesive sheet 32 to expose one side surfaces of unfired multilayer bodies 110.

Figure 13:
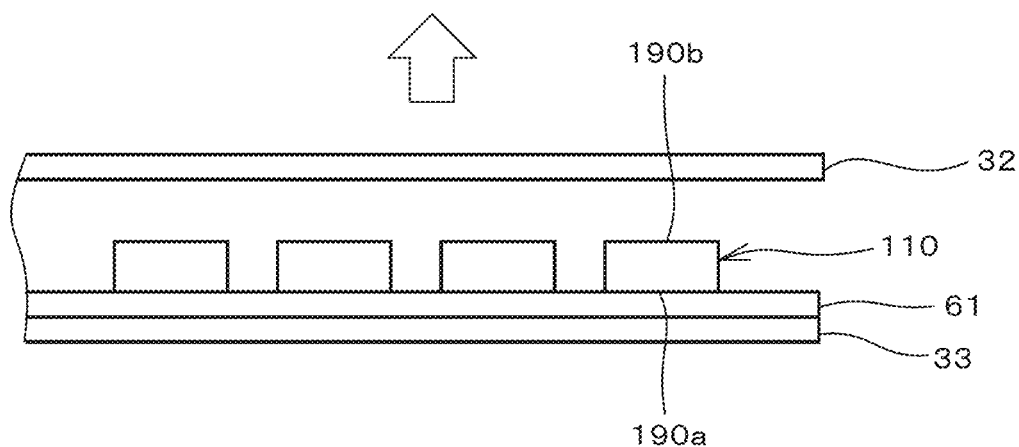
FIG. 13 is a diagram showing the state where the unfired multilayer bodies on the first insulating sheet having the third adhesive sheet bonded thereto are peeled off from the second adhesive sheet.

The third adhesive sheet having an elongated shape is bonded to first insulating sheet 61, and then, each unfired multilayer body 110 is peeled off from second adhesive sheet 32. The third adhesive sheet is preferably higher in adhesive strength than second adhesive sheet 32, for example. FIG. 13 is a diagram showing the state where unfired multilayer bodies 110 on first insulating sheet 61 having a third adhesive sheet 33 bonded thereto are peeled off from second adhesive sheet 32.

The method of peeling off unfired multilayer bodies 110 from second adhesive sheet 32 is not limited to the above-described method. The adhesive strength of second adhesive sheet 32 may be weakened before second adhesive sheet 32 is peeled off. For example, when second adhesive sheet 32 includes the material having adhesive strength that is weakened by heating, second adhesive sheet 32 is heated. When second adhesive sheet 32 includes the material having adhesive strength that is weakened by ultraviolet irradiation, second adhesive sheet 32 is irradiated with ultraviolet rays.

Step S8 after step S7 in FIG. 5 includes polishing one side surfaces of unfired multilayer bodies 110 that are exposed as a result of peeling off of second adhesive sheet 32. Second side surface 190*b* as one side surface is able to be polished by the method similar to the method to polish first side surface 190*a* as the other side surface. By polishing second side surface 190*b* as one side surface of each unfired multilayer body 110, any foreign matters existing on second side surface 190*b* are able to be removed, and an occurrence of a gap between second side surface 190*b* and the second insulating sheet is able to be significantly reduced or prevented (as described herein). Thus, peeling off of second insulating layer 13 in multilayer body 11 after firing is able to be significantly reduced or prevented.

In step S9 after step S8 in FIG. 5, in order to form the second insulating layer, the second insulating sheet having an elongated shape is affixed onto the polished one side surfaces of unfired multilayer bodies 110. The second insulating sheet may include the same or similar insulating sheet as first insulating sheet 61 that includes an insulating layer and an adhesive layer. The second insulating sheet is sized to be affixed onto one side surfaces of the plurality of unfired multilayer bodies 110. Thus, one second insulating sheet is affixed onto one side surfaces of the plurality of unfired multilayer bodies 110.

Figure 14:
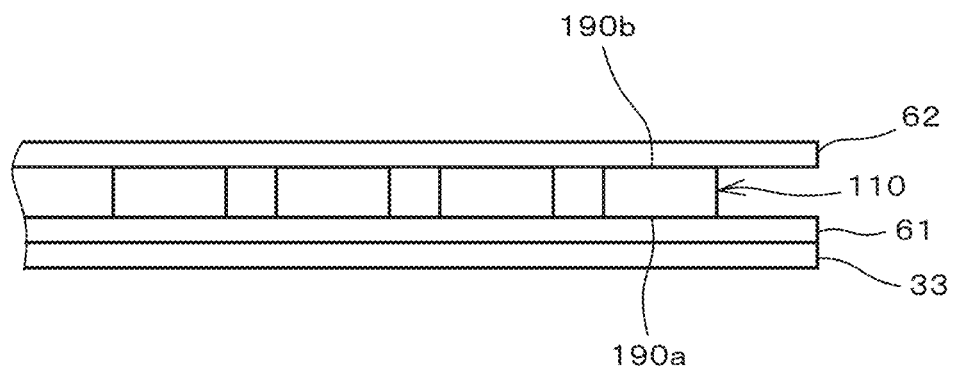
FIG. 14 is a diagram showing the state where the second insulating sheet is affixed onto the second side surfaces as one side surfaces of the unfired multilayer bodies.

FIG. 14 is a diagram showing the state where a second insulating sheet 62 is affixed onto second side surfaces 190*b* as one side surfaces of the plurality of unfired multilayer bodies 110.

Then, third adhesive sheet 33 is peeled off. Third adhesive sheet 33 is able to be peeled off by any method, but is peeled off after its adhesive strength is weakened, for example.

In step S10 after step S9 in FIG. 5, first insulating sheet 61 and second insulating sheet 62 are cut to separate unfired multilayer bodies 110 from each other. Specifically, in the state where one first insulating sheet 61 is affixed onto the other side surfaces of the plurality of unfired multilayer bodies 110 and one second insulating sheet 62 is affixed onto one side surfaces of the plurality of unfired multilayer bodies 110, pressing force is applied from outside first insulating sheet 61 and second insulating sheet 62 to unfired multilayer bodies 110. Thus, first insulating sheet 61 and second insulating sheet 62 are cut to separate unfired multilayer bodies 110 from each other.

In order to ensure uniform surface pressure to be applied to each unfired multilayer body 110, a pressing force is preferably applied to each of the plurality of unfired multilayer bodies 110 included in a prescribed number of rows among unfired multilayer bodies 110 provided in a plurality of rows, for example. The prescribed number of rows may be one row, for example. However, the prescribed number of rows is not limited to one row, but may be two rows, three rows, and the like.

Figure 15A:
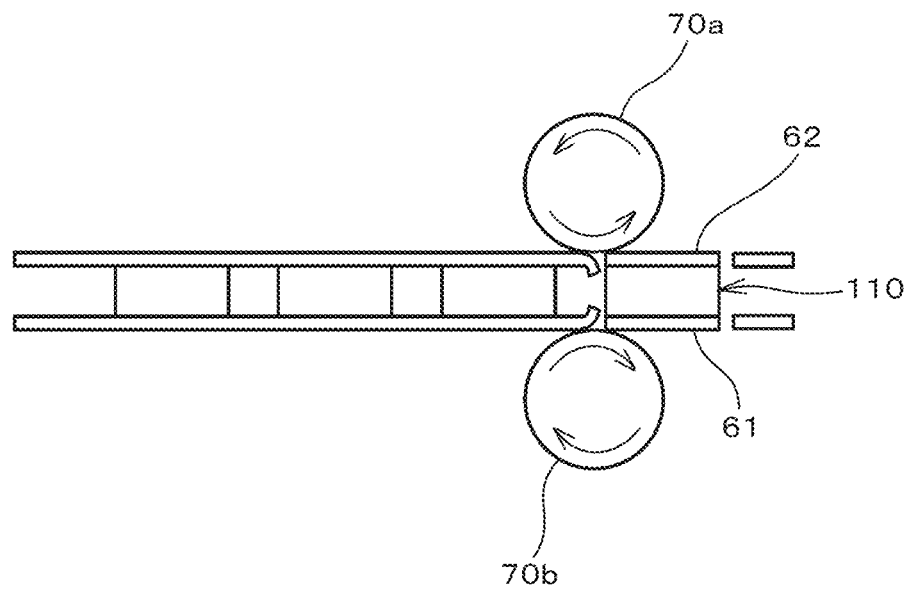
FIGS. 15A and 15B each are a diagram showing an example of a method of cutting the first insulating sheet and the second insulating sheet to separate the unfired multilayer bodies from each other.
Figure 15B:
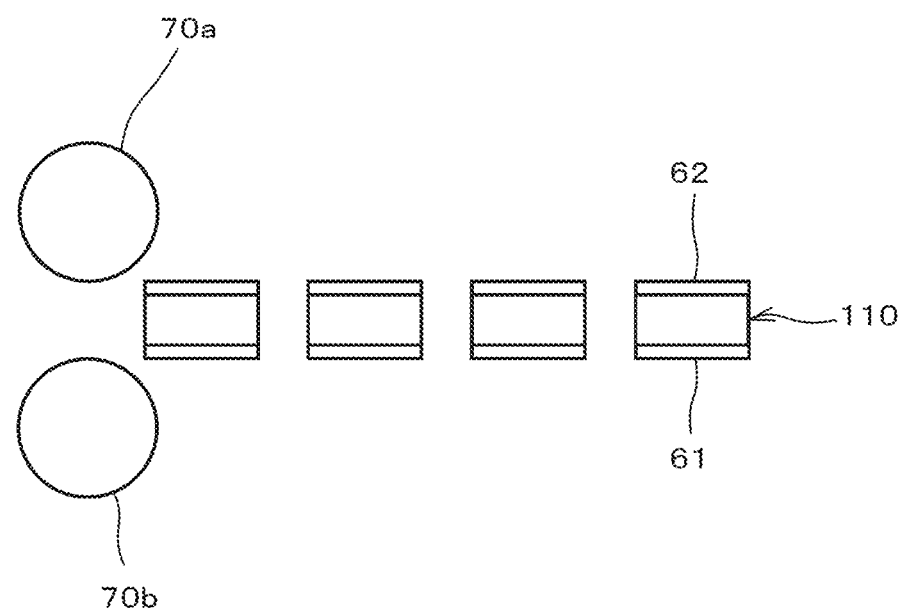

FIGS. 15A and 15B each are a diagram showing an example of a method of cutting first insulating sheet 61 and second insulating sheet 62 to separate unfired multilayer bodies 110 from each other. As shown in FIG. 15A, first insulating sheet 61, unfired multilayer bodies 110 and second insulating sheet 62 are sandwiched between a pair of rollers 70*a* and 70*b*. In this state, while rotating the pair of rollers 70*a* and 70*b*, pressing force is applied to unfired multilayer bodies 110 from outside first insulating sheet 61 and second insulating sheet 62.

A shear force is applied to each of first insulating sheet 61 and second insulating sheet 62 between the region in contact with unfired multilayer body 110 and the region not in contact with unfired multilayer body 110. By this shear force, first insulating sheet 61 and second insulating sheet 62 are cut between the region in contact with unfired multilayer body 110 and the region not in contact with unfired multilayer body 110, as shown in FIG. 15B.

In the case where the above-described prescribed number of rows is one row, first insulating sheet 61 and second insulating sheet 62 are cut to separate the plurality of unfired multilayer bodies 110 included in one row from each other.

Figure 16A:
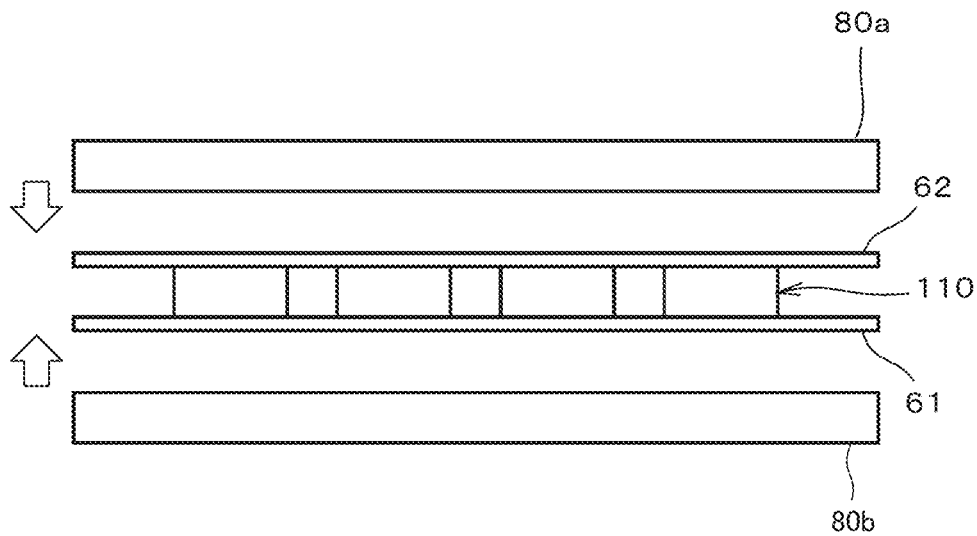
FIGS. 16A and 16B each are a diagram showing another method of cutting the first insulating sheet and the second insulating sheet to separate the unfired multilayer bodies from each other.
Figure 16B:
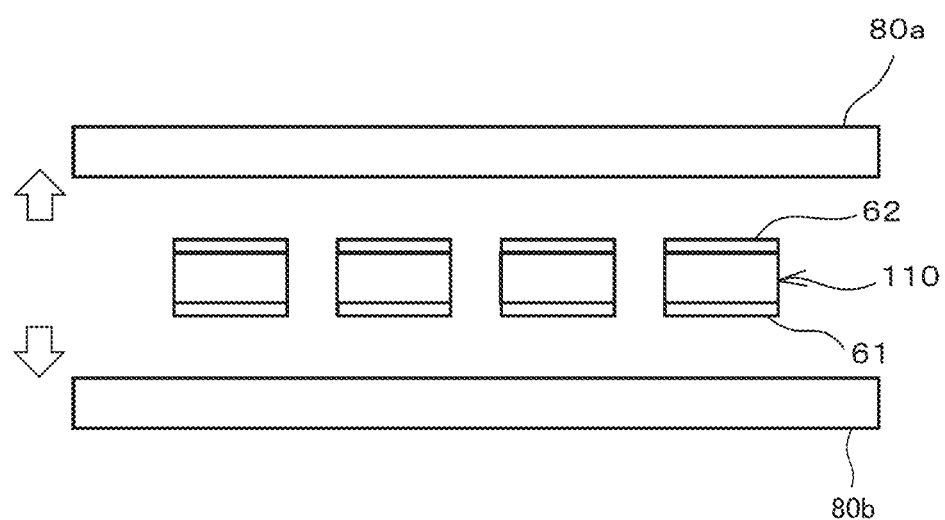

FIGS. 16A and 16B each are a diagram showing another method of cutting first insulating sheet 61 and second insulating sheet 62 to separate unfired multilayer bodies 110 from each other. As shown in FIG. 16A, first insulating sheet 61, unfired multilayer bodies 110 and second insulating sheet 62 are sandwiched between a pair of pressing elements 80*a* and 80*b*. The surfaces of pressing elements 80*a* and 80*b* that come into contact with at least first insulating sheet 61 or second insulating sheet 62 preferably include an elastic body such as rubber, for example.

In the state where first insulating sheet 61, unfired multilayer bodies 110 and second insulating sheet 62 are sandwiched between the pair of pressing elements 80*a* and 80*b*, pressing force is applied to unfired multilayer bodies 110 from outside first insulating sheet 61 and second insulating sheet 62. Thus, shear force is applied to first insulating sheet 61 and second insulating sheet 62 between the region in contact with each unfired multilayer body 110 and the region not in contact with each unfired multilayer body 110. Thus, first insulating sheet 61 and second insulating sheet 62 are cut to separate unfired multilayer bodies 110 from each other as shown in FIG. 16B.

In step S11 after step S10 in FIG. 5, an unfired multilayer body 110 is fired that includes first side surface 190*a* to which the cut first insulating sheet 61 is affixed and second side surface 190*b* to which the cut second insulating sheet 62 is affixed. By firing, unfired multilayer body 110 is formed into multilayer body 11, the cut first insulating sheet 61 is formed into first insulating layer 12, and the cut second insulating sheet 62 is formed into second insulating layer 13.

In step S12 after step S11, first external electrode 14*a* and second external electrode 14*b* are formed. Also, after applying an external electrode paste to unfired multilayer body 110 having the cut first insulating sheet 61 and the cut second insulating sheet 62 affixed thereto, the resultant may be simultaneously or substantially simultaneously fired.

Thus, multilayer ceramic capacitor 10 is provided by the above-described manufacturing steps.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing an electronic component including at least a multilayer body and an insulating layer that covers a side surface of the multilayer body, the multilayer body including a plurality of dielectric layers and a plurality of internal electrodes that are alternately stacked on one another, the method comprising:
   preparing an unfired multilayer body that is to be formed as the multilayer body after firing, the unfired multilayer body including:
      a first main surface and a second main surface that are opposite to each other in a stacking direction;
      a first side surface and a second side surface that are opposite to each other in a width direction substantially orthogonal to the stacking direction; and
      a first end surface and a second end surface that are opposite to each other in a length direction substantially orthogonal to the stacking direction and the width direction;
   bonding one main surface of the first main surface and the second main surface of the unfired multilayer body to a first adhesive sheet having an elongated shape;
   conveying the first adhesive sheet having the one main surface of the unfired multilayer body bonded thereto in a first direction in which the first adhesive sheet approaches a second adhesive sheet having an elongated shape, and bonding one side surface of the first side surface and the second side surface of the unfired multilayer body to the second adhesive sheet;
   conveying the second adhesive sheet in a second direction different from the first direction to peel off the unfired multilayer body bonded to the first adhesive sheet and the second adhesive sheet from the first adhesive sheet;
   removing foreign matters from the other side surface of the first side surface and the second side surface of the unfired multilayer body having the one side surface bonded to the second adhesive sheet; and
   forming a first insulating layer on the other side surface from which the foreign matters have been removed.

2. The method of manufacturing an electronic component according to claim 1, wherein
   the plurality of internal electrodes includes a first internal electrode and a second internal electrode;
   the unfired first internal electrode and the unfired second internal electrode are exposed at each of the first side surface and the second side surface of the unfired multilayer body;
   in the forming the first insulating layer, a first insulating sheet is affixed to the other side surface from which the foreign matters have been removed; and
   the method further includes:
      peeling off the unfired multilayer body from the second adhesive sheet to expose the one side surface;
      polishing the exposed one side surface of the unfired multilayer body; and
      affixing a second insulating sheet in order to form a second insulating layer on the one side surface that has been polished.

3. The method of manufacturing an electronic component according to claim 2, wherein
   the first insulating sheet is affixed to a plurality of the other side surfaces of a plurality of the unfired multilayer bodies;
   the second insulating sheet is affixed to a plurality of the one side surfaces of the unfired multilayer bodies; and
   the method further includes:
      in a state where the first insulating sheet as one sheet is affixed to the other side surfaces of the unfired multilayer bodies, and the second insulating sheet as one sheet is affixed to the one side surfaces of the unfired multilayer bodies, applying pressing force from outside the first insulating sheet and the second insulating sheet to each of the unfired multilayer bodies, and cutting the first insulating sheet and the second insulating sheet to separate the unfired multilayer bodies from each other.

4. The method of manufacturing an electronic component according to claim 3, wherein
   in the bonding the one side surface of the first side surface and the second side surface of the unfired multilayer body to the second adhesive sheet, the unfired multilayer bodies are provided in a row and are substantially simultaneously bonded to the second adhesive sheet; and
   in the cutting the first insulating sheet and the second insulating sheet to separate the unfired multilayer bodies from each other, the pressing force is applied to each of the unfired multilayer bodies included in a prescribed number of rows among the unfired multilayer bodies provided in rows.

5. The method of manufacturing an electronic component according to claim 2, wherein the first insulating sheet includes a surface on which an adhesive layer is formed, and the adhesive layer is higher in adhesive strength than the first adhesive sheet and the second adhesive sheet.

6. The method of manufacturing an electronic component according to claim 1, wherein the first direction and the second direction define an obtuse angle.

7. The method of manufacturing an electronic component according to claim 1, wherein the first adhesive sheet is lower in adhesive strength than the second adhesive sheet.

8. The method of manufacturing an electronic component according to claim 1, wherein each of the plurality of internal electrodes includes Ni.

9. The method of manufacturing an electronic component according to claim 1, wherein each of the plurality of internal electrodes includes a plurality of dielectric particles.

10. The method of manufacturing an electronic component according to claim 1, wherein each of the plurality of dielectric layers includes a plurality of crystalline particles each including Ba and Ti.

11. The method of manufacturing an electronic component according to claim 1, further comprising a step of forming a first external electrode and a second external electrode.

12. The method of manufacturing an electronic component according to claim 11, wherein
   the first external electrode covers substantially an entire surface of the first end surface of the multilayer body; and
   the second external electrode covers substantially an entire surface of the second end surface of the multilayer body.

13. The method of manufacturing an electronic component according to claim 11, wherein
   the plurality of internal electrodes include at least a first internal electrode and a second internal electrode;
   the first external electrode is electrically connected to the first internal electrode; and the second external electrode is electrically connected to the second internal electrode.

14. The method of manufacturing an electronic component according to claim 1, wherein the first external electrode and the second external electrode each include an underlying electrode layer and a plated layer that is provided on the underlying electrode layer.

15. The method of manufacturing an electronic component according to claim 1, wherein the second adhesive sheet is conveyed at a speed higher than a speed at which the first adhesive sheet is conveyed.

16. The method of manufacturing an electronic component according to claim 2, further comprising peeling off a third adhesive sheet from the first insulating sheet.

\* \* \* \* \*